United States Patent Office 3,359,596
Patented Dec. 26, 1967

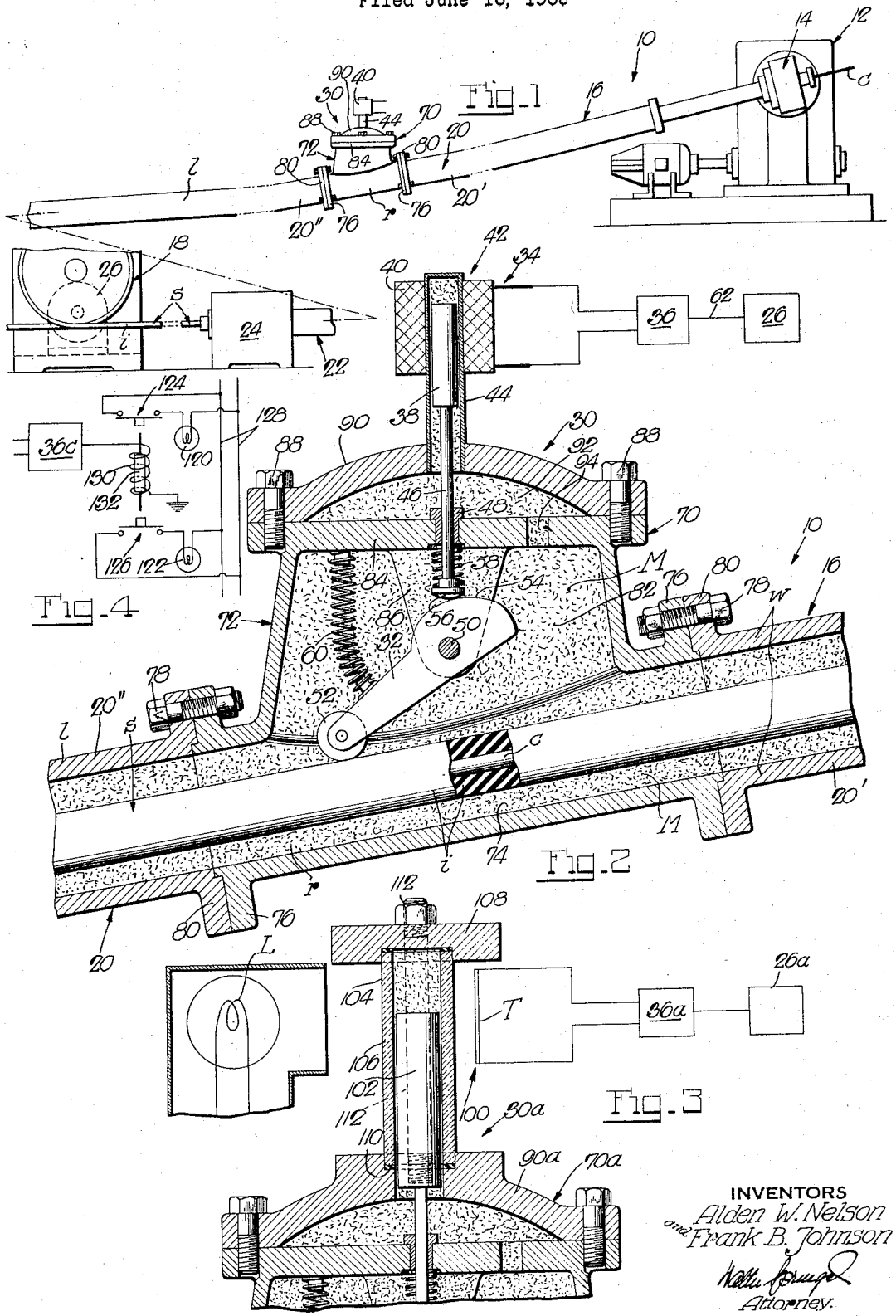

3,359,596
STOCK CATENARY CONTROL IN CONTINUOUS VULCANIZER
Alden W. Nelson, West Mystic, and Frank B. Johnson, Mystic, Conn., assignors to Crompton & Knowles Corporation, Worcester, Mass., a corporation of Massachusetts
Filed June 16, 1965, Ser. No. 464,396
12 Claims. (Cl. 18—6)

This invention relates to the vulcanization of rubber-coated core stock in general, and to continuous vulcanizers for rubber-coated core stock in motion in particular.

Vulcanizers of this type are used most frequently in the continuous production of rubber-insulated conductor stock such as wire or cable. These vulcanizers are in the form of elongated conduits which more often than not are disposed generally horizontally owing to their usually considerable length, and are divided into successive uninterrupted chambers or legs which hold a vulcanizing medium such as high-pressure steam and a cooling medium such as water, respectively. Thus, the conductor receives on its continuous pass through the customary side delivery head of an extruder a coating of rubber or rubber-like insulation, and then passes directly into the steam leg and thence into the cooling leg of a vulcanizer for complete vulcanization and cooling of its coating before passing from the vulcanizer into exposure with the atmosphere. The conductor is thus continuously passed through the delivery head of the extruder and through the vulcanizer by being paid out to the extruder head usually by a power-operated back-up capstan, and being drawn through the extruder head and vulcanizer by a power-operated take-away capstan at the exit end of the vulcanizer from which the finished stock usually passes to a take-up for its continuous wind on reels. To prevent damage to the insulated stock and also to keep the power requirements of the capstans at a reasonable minimum, it is customary to permit the passing stock in the vulcanizer to sag into catenary form, more or less. However, owing to uncontrollable factors, the passing stock in the vulcanizer will inevitably vary in its catenary form even at uniform drive of the capstans, with the result that the passing stock will on occasion come into contact with, and be dragged on, the wall of the vulcanizer within an initial length of the latter in which its insulation is only partly vulcanized and, hence, still sufficiently soft to be permanently damaged by such rubbing contact with the vulcanizer wall. To avoid damage to the insulated stock from this cause, recourse has previously been had to a device of a type that includes a sensing element inside the vulcanizer which, by continuous follower contact with the stock at a place within the initial vulcanizer length at which variations in its catenary form, i.e., its rise and fall, are most pronounced, is moved in response to such variations in the stock's catenary form. Such responsive motion of the sensing element is being transmitted, through a rotary shaft passing from the inside to the outside of the vulcanizer, to an outside electric control for operating the same, with the operating control being used indirectly or directly for slow-down or speed-up of the take-away capstan, whichever is required in any particular situation to keep the insulated stock out of contact with the wall of the vulcanizer over its initial length. While such a system is satisfactory in general, it does have a single, but relatively serious, drawback. Thus, with the pressure of the steam in the vulcanizer being quite considerable, such as 250 lbs. per inch$^2$, for example, difficulties have been encountered in sealing the through-bearing in the vulcanizer for the rotary shaft with adequate tightness to prevent steam leakage therethrough, yet afford the shaft adequate freedom to be turned by the sensing element in unfailing response to all variations in the catenary form of the insulated stock. In consequence, in complying with the first dictate of avoiding steam leakage by providing a correspondingly tight bearing seal, the rotary shaft does not have sufficient freedom in the bearing to permit the sensing element fully to respond in motion to variations of the catenary form of the stock at all times which brings about occasional malfunctioning of the device.

It is an object of the present invention to provide for a continuous vulcanizer a device of this type which does not have the aforementioned drawback of the prior device, and which functions with utmost reliability and complete response in each instance to any and all variations in the catenary form of the stock, yet operates on the same unique principle as, and in simplicity of construction and low cost compares favorably with, the prior device.

It is another object of the present invention to provide for a continuous vulcanizer a device of this type which is devoid of any shaft or other mechanical operating connection between the sensing element within the vulcanizer and the outside control and, instead, provides an electric control with a component having elements inside and outside of the vulcanizer and an element which is continuous with and serves as part of the uninterrupted steam-confining vulcanizer wall, of which the inside element is moving with the sensing element and through the wall part reacts with the outside part in modifying an operating voltage of the control in response to its motion, with the operating voltage being applied for visual or audible indication of the stock's catenary form or directly for speed variation of the take-away capstan, or both. With this arrangement, the inside part of the control component may be moved by the sensing element in the high-pressure steam entirely unimpeded by the latter and thus transmit the full effect of the operational motions of the sensing element to the outside part of the control component with the utmost reliability and accuracy. Also, owing to the unimpeded movability of the sensing element and therewith moving inside element of the control component in the high-pressure steam, the spring-force on the preferably spring-loaded sensing element may be kept very small for optimum motion response of the latter to even minute variations in the catenary form of the stock.

It is a further object of the present invention to provide for a continuous vulcanizer a device of this type, of which the aforementioned control component may be a variable inductance, or alternatively a variable resistance, which modifies the input to an amplifier and, hence, the output thereof in response to the dictates of the sensing element. In case of variable inductance, the wall part of the component is advantageously a non-magnetic flux-passing shell open to the interior of the vulcanizer and closed to the outside, while the inside and outside parts are an armature movable in the shell in following relation with the sensing element and a coil on the outside of the shell in coupled relation with the inside armature. In case of a variable resistance, the wall part of the component may be a transparent shell open to the interior of the vulcanizer and closed to the outside, with the inside and outside parts being a light shield movable in the shell in following relation with the sensing element and an outside light source and therewith cooperating light-sensitive target of varying electrical resistance with varying light exposure, of which the shield variably exposes the target to the light source on operational movements of the sensing element.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a view of an exemplary installation for continuously forming rubber-insulated conductor stock, including a continuous vulcanizer embodying the present invention;

FIG. 2 is an enlarged, fragmentary section through the vulcanizer of FIG. 1;

FIG. 3 is a fragmentary section through a continuous vulcanizer which is similar to that of FIG. 2, but embodies the invention in a modified manner; and FIG. 4 is a diagram of a modified control component that may be used in lieu of another control component in FIG. 2, for example.

Referring to the drawings, and more particularly to FIGS. 1 and 2 thereof, the reference numeral 10 designates an installation for the continuous production of vulcanized insulated stock, such as rubber-insulated conductor stock $s$, for example. The installation 10 comprises, in this instance, an extruder 12 with a side-delivery head 14, a continuous vulcanizer 16, and a take-away capstan 18 as well as a back-up capstan (not shown). The bare conductor stock $c$ is by the back-up capstan paid out to the extruder head 14 and succeeding vulcanizer 16 and drawn therethrough by the take-away capstan 18. In thus passing through the extruder head 14, the conductor stock receives a coating of vulcanizable rubber or rubber-like insulation $i$. The thus coated stock $s$ passes from the extruder head 14 directly into and through the vulcanizer 16 in which it is subjected to a vulcanizing medium M, usually high-pressure steam, in a steam chamber or leg 20 thereof and then to a cooling medium usually water, in an immediately succeeding water chamber or leg 22 thereof at the end of which the stock passes from the vulcanizer through a seal 24 and on to the take-away capstan 18 which is power-driven, in this instance by a variable-speed motor 26.

The stock $s$ is customarily permitted to assume a caternary form in the vulcanizer 16 from the extruder head 14 at least over an initial length $l$ of the steam leg 20 within which the rubber coating $i$ of the stock is only partly vulcanized and, hence, still sufficiently soft to become damaged if dragged on the vulcanizer wall $w$, and the back-up capstan (not shown) and take-away capstan 18 are driven at speeds at which the stock caternary is not only maintained as such, but is in its inevitable variations also controlled so as to pass through this initial length of the steam leg 20 with clearance from the wall $w$ thereof at all times. This initial length $l$ at least of the steam leg 20 is thus generally reclining and customarily arranged in generally caternary form (FIG. 1) approximating that of the stock $s$ therein. Also, the back-up capstan is usually driven at uniform speed for uniform pay-out of the conductor stock $c$ to the installation, while the speed of the take-away capstan 18 is usually varied as required to keep the stock $s$ in proper caternary form and out of contact with the wall $w$ of the steam leg at least over its length $l$.

In order either to assist an attendant in undertaking, or fully automatically causing, regulation of the operating speed of the take-away capstan 18 to this end, there is provided a device 30 which signals variations in the catenary form of the stock in accordance with which the speed of the capstan motor 26 is changed. The device 30 provides a sensing element 32 in the steam leg 20 which is guided therein for movement in following relation with the passing stock $s$ on its rise and fall with variations in its catenary form, and means 34 for producing a signal voltage which varies in response to movement of the sensing element 32. The sensing element 32 is thus in following relation with the stock $s$ preferably in a region $r$ of the length $l$ of the steam leg in which the rise and fall of the stock with variations in its catenary form is greatest. The voltage producing means 34 comprises, in this instance, an amplifier 36 the output of which is the signal voltage, and two cooperating elements 38 and 40 on the inside and outside of the steam leg 20 respectively of which element 38 is guided for movement in following relation with the sensing element 32, and element 40 reacts through the wall $w$ of the steam leg with element 38 in modifying the input to the amplifier according to the operational movements of element 38.

In the present instance, the input to the amplifier 36 is modified by a variable inductance 42 having an armature and cooperating coil which form the elements 38 and 40, respectively, (FIG. 2). The armature 38 inside the steam leg 20 extends into a casing 44 of non-magnetic flux-passing material which is open to the interior of the steam leg but closed to the outside thereof and thus forms part of the steam-confining wall $w$ of the steam leg. The casing 44 is in its preferred form a cylindrical shell of stainless steel which with its open end is permanently secured in the wall of the steam leg, and the coil 40 is mounted on this shell 44 on the outside thereof in coupled relation with the inside armature 38, with the armature having sufficient clearance in the shell 44 to admit to the latter throughout the high-pressure vulcanizing steam so that the same has no tendency to displace the armature in the shell. The armature 38 is in this instance operationally guided with a reduced shank 46 thereof in a bushing 48 in the steam leg. The sensing element 32 is in this instance an arm which at one end is pivotally mounted at 50 in the steam leg about a substantially horizontal axis, and has at its other end a roller 52 in follower engagement with the stock $s$. The pivoted end of the arm 32 is provided with a cam formation 54 with which a follower 56 on the end of the armature shank 46 cooperates. The armature 38 with its shank 46 is in this instance normally urged by a spring 58 into following relation with the cam formation 54 on the arm 32, while the latter is with its roller 52 normally urged by a spring 60 into following relation with the stock $s$.

In operation of the installation, the stock $s$ passing through the steam leg 20 will undergo inevitable variations in its catenary form which the sensing element 32 picks up and passes on to the armature 38 that cooperates with the coil 40 in modifying the input to the amplifier so that the output voltage thereof accurately reflects the variation in the stock catenary, both in direction and magnitude. The output of the amplifier 36 is in this instance used for direct operation of the variable-speed motor 26 of the take-away capstan 18, and the amplifier 36 has to this end the electrical connection 62 with the motor 26 (FIG. 2). Thus, assuming that variation in the catenary form of the stock leads to a rise of the latter at the sensing element 32, it is obvious that the operating speed of the take-away capstan 18 is then too high to stop this rise of the stock. However, with such rise of the stock the sensing element 32 rises also, with the result that the descending cam formation 54 of the latter shifts the armature 38 into decreasing coupled relation with the coil 40, thereby lowering the input to the amplifier 36 and with it the output of the latter for slow-down of the motor 26 and, hence, of the take-away capstan 18 to halt further rise of the stock $s$. Conversely, whenever variation in the catenary form of the stock leads to a fall of the latter at the sensing element 32, the operating speed of the take-away capstan is then too low to stop the fall of the stock. However, with such fall of the stock the sensing element 32 falls also, with the result that the ascending cam formation 54 of the latter shifts the armature 38 into increasing coupled relation with the coil 40, thereby increasing the input to the amplifier 36 and with it the output of the latter for speed-up of the motor 26 and, hence, of the take-away capstan 18 to halt further fall of the stock $s$. The take-away capstan 18 thus unfailingly responds in controlled variation of its operating speed to any and all variations in the catenary form of the stock regardless of whether such variations are initiated by the stock or by speed differentials between the back-up and take-away capstans, or both, with said response of the take-away capstan 18 being such that the stock s will over its catenary extent deviate from a mean catenary form, such as in FIG. 2, for example, insufficiently to come even near engagement with the wall w of the steam leg 20 over its length l at any time during operation of the installation.

The device 30 responds instantaneously and with particular accuracy to all, and even the slightest, variations in the catenary form of the stock, wherefore the take-away capstan 18 responds in variations of its operating speed as instantaneously and with equal accuracy to such catenary variations of the stock. This is due to the fact that the moving parts of the device 30, i.e., the sensing element 32 and the armature 38, are unimpeded in their operative motions in response to variations in the stock's catenary, and these parts 32 and 38 are at all times held in unfailing following relation with the stock s and with each other by the springs 60 and 58 which for that purpose may be relatively weak springs.

The described device 30 is preferably and advantageously embodied in a control unit 70 for ready assembly with successive sections 20' and 20" of the steam leg 20. To this end, the control unit 70 comprises a housing 72 with a through-passage 74 and attachment means at the ends thereof, in this instance in the form of flanges 76, for securement by bolts 78 to similar flanges 80 on the sections 20' and 20" of the steam leg 20. The housing 72 further comprises a side chamber 82 open to the through-passage 74 and having a top wall 84 in which the guide bushing 48 for the armature shank 46 is mounted, and from which depend spaced lugs 86 for the pivot mounting 50 of the sensing element 32. Secured at 88 to the top wall 84 of the side chamber 82 is a cap 90 in which the shell 44 is mounted and which forms with the top wall 84 a dome-shaped extension 92 of the side chamber 82 with which it is in communication through an aperture 94 in the top wall 84.

Reference is now had to FIG. 3 which shows a modified device 30a having, in lieu of the described variable inductance 42 of FIG. 2, a variable resistance 100 in the form of a light-sensitive target T the electrical resistance of which varies with varying exposure to a light source L which may be an infra-red bulb, for example. The target T modifies the input to the amplifier 36a the output of which is in this instance also used for direct operation of the variable-speed motor 26a of a take-away capstan (not shown). For varying exposure of the target T to the light source L, there is provided a light shield 102 in a transparent shell 104 on a cap 90a of a control unit 70a which in all other respects may be like the described control unit 70 of FIG. 2, except that the cam formation on the sensing element (not shown) is such that the light shield 102 will be moved up and down by the sensing element on the rise and fall, respectively, of the latter with the stock. The shell 104 is formed in this instance by a transparent sleeve 106 and a cover 108 which closes and seals the top end of the sleeve 106 to the outside and firmly retains the latter in a sealed seat 110 in the cap 90a by staybolts 112 which are anchored in the latter.

Assuming now that in operation of an installation with the control unit 70a variation of the catenary form of the stock leads to a rise of the latter, take-away capstan will then require a reduction in speed to halt a further stock rise. The sensing element will then participate in such stock rise and by its cam formation shift the light shield 102 upwardly for diminishing exposure of the target T to the light source L and ensuing lower input to the amplifier 36a, with the correspondingly lower output of the latter then operating the motor 26a and the take-away capstan driven thereby at reduced speed to halt a further rise of the stock. Conversely, when variation of the catenary form of the stock leads to a fall of the latter, the take-away capstan will then require an increase in its speed to halt further fall of the stock. The sensing element will then participate in such stock fall and by its cam formation shift the light shield 102 downwardly for increasing exposure of the target T to the light source L and ensuing higher input to the amplifier 36a, with the correspondingly higher output of the latter then operating the motor 26a and the take-away capstan driven thereby at increased speed to halt a further fall of the stock. The control unit 70a thus performs the same as the control unit 70 of FIG. 2 and has the same advantages as the latter.

While in the installation of FIGS. 1 and 2 the output of the amplifier is used for direct operation of the variable-speed motor of the take-away capstan, it is also entirely feasible to use the output of the amplifier for giving warning signals to an attendant to regulate the speed of the motor of the take-away capstan in order to avoid further rise or fall of the stock short of engagement of the latter with the wall of the steam leg. To this end, there may be provided low and high-signal bulbs 120 and 122 (FIG. 4) which are controlled by normally-open switches 124 and 126, respectively, and connected with a current source 128. Energized by the output of the amplifier 36c is a coil 130 with which cooperates an armature 132 that is longitudinally shifted in opposite directions on increase and decrease, respectively, of the amplifier output passing through the coil 130. The armature 132 is coordinated with the switches 124 and 126 so as to close them when the amplifier output reaches predetermined low and high values, respectively. Thus whenever the stock in the steam leg should rise sufficiently to require fairly early speed reduction of the take-away capstan to avoid contact of the stock with the wall of the steam leg, the output of the amplifier 36c will be so high that the armature 132 will be shifted into a position to close switch 126 and, hence, the circuit of the high-signal bulb 122 for illumination of the latter. Conversely, whenever the stock in the steam leg should fall sufficiently to require fairly early speed-up of the take-away capstan to avoid contact of the stock with the wall of the steam leg, the amplifier output will be so low that the armature 132 will be shifted into a position in which to close switch 124 and, hence, the circuit of the low-signal bulb 120 for illumination of the latter. Alternatively, the output of the amplifier could be used for direct operation of the variable-speed motor of the take-away capstan, as well as for operating high and low signal bulbs such as in FIG. 4, in which case the signal bulbs will in time indicate possible malfunctioning of the variable-speed motor which would otherwise remain undetected until damage to the stock is detected.

The invention may be carired out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a continuous vulcanizer installation, the combination with a reclining tubular chamber with a peripheral wall for confining a vulcanizing medium therein, a variable-speed feed for continuously moving through said chamber vulcanizable stock in catenary form which varies with the speed of said feed, and a sensing element mounted within said chamber for movement in following relation with stock therein on its rise and fall with variations in its catenary form, of an electrical device signalling variations in the catenary form of stock in said chamber whereby to control the speed of said feed for stock movement through said chamber with clearance from said wall thereof, said device having means to produce an operating voltage, including first and second cooperating elements inside and outside said chamber, respectively, of which said first element is guided in said chamber for movement therein, with said first and second elements reacting through said chamber wall to modify said voltage in response to movement of said first element, and said first element being moved by said sensing element.

2. In a continuous vulcanizer installation, the combination with a reclining tubular chamber with a steam-confining peripheral wall, a variable-speed feed for continuously moving through said chamber vulcanizable stock in catenary form which varies with the speed of said feed, and a sensing element mounted within said chamber for movement in following relation with stock therein on its rise and fall with variations in its catenary form, of an electrical device signalling variations in the catenary form of stock in said chamber whereby to control the speed of said feed for stock movement through said chamber with clearance from said wall thereof, said device having means to produce an operating voltage, including first and second cooperating elements inside and outside said chamber, respectively, and a casing open to and projecting outwardly from said chamber and being closed to the outside to form part of said steam-confining chamber wall, of which said first element is guided for movement in said casing and said second element is on the outside of said casing and reacts with said first element through said casing in modifying said voltage in response to movement of said first element, and said first element being moved by said sensing element.

3. The combination in a continuous vulcanizer installation as set forth in claim 2, in which said device further includes an amplifier the output of which is said operating voltage, said casing is a non-magnetic flux-passing shell, and said first and second elements are an armature and a coil, respectively, in coupled relation to modify the input to the amplifier.

4. The combination in a continuous vulcanizer installation as set forth in claim 2, in which said device further includes an amplifier the output of which is said operating voltage, said casing is a transparent shell, said first element is a light shield, and said second element is a light source and therewith cooperating light-sensitive target of varying electrical resistance with varying light exposure to modify the input to the amplifier, of which said light shield variably exposes said target to said light source.

5. In a continuous vulcanizer installation, the combination with a reclining tubular chamber with a steam-confining peripheral wall, a feed with a variable-speed motor for continuously moving through said chamber vulcanizable stock in catenary form which varies with the speed of said feed, and a sensing element mounted within said chamber for movement in following relation with stock therein on its rise and fall with variations in its catenary form, of a control for said motor to operate said feed for stock movement through said chamber with clearance from said wall thereof, said control having an amplifier the output voltage of which operates said motor, first and second elements inside and outside said chamber, respectively, and a casing open to and projecting outwardly from said chamber and being closed to the outside to form part of said steam-confining chamber wall, of which said first element is guided for movement in said casing, and said second element is on the outside of said casing and reacts with said first element through said casing in modifying the input to the amplifier in response to movement of said first element, and first element being moved by said sensing element.

6. The combination in a continuous vulcanizer installation as set forth in claim 5, in which said casing is a non-magnetic flux-passing shell, and said first and second elements are an armature and a coil, respectively, serving as a variable inductance.

7. The combination in a continuous vulcanizer installation as set forth in claim 5, in which said casing is a transparent shell, said first element is a light shield, and said second element is a light source and therewith cooperating light-sensitive target of varying electrical resistance with varying light exposure, of which said light shield variably exposes said traget to said light source.

8. A control unit for assembly with successive sections of a reclining steam leg of a continuous vulcanizer for continuously fed vulcanizable stock in catenary form, comprising a housing having a longitudinal through-passage with attachment means at the opposite ends thereof and a continuous wall closing said housing except at the ends of said passage; and a device for signalling variations in the catenary form of stock in said housing, having a sensing element mounted in said housing for movement in following relation with stock therein on its rise and fall with variations in its catenary form, and means to produce an operating signal voltage, including first and second cooperating elements inside and outside said housing, respectively, and a casing open to and projecting outwardly from said housing and being closed to the outside to form part of said housing wall, of which said first element is guided for movement in said casing and said second element is mounted on said casing on the outside thereof and reacts with said first element through said casing in modifying said voltage in response to movement of said first element, and said first element being moved by said sensing element.

9. A control unit as set forth in claim 8, in which said voltage producing means further includes an amplifier the output of which is said signal voltage, said casing is a non-magnetic flux-passing shell, and said first and second elements are an armature and a coil, respectively, in coupled relation to modify the input voltage to the amplifier.

10. A control unit as set forth in claim 8, in which said voltage producing means further includes an amplifier the output of which is said signal voltage, said casing is a transparent shell, said first element is a light shield, and said second element is a light source and therewith cooperating light-sensitive target of varying electrical resistance with varying light exposure to modify the input voltage to the amplifier, of which said light shield variably exposes said target to said light source.

11. A control unit as set forth in claim 8, in which said sensing element is spring-urged toward the axis of said through-passage, and said first element is spring-urged into follower engagement with said sensing element.

12. A control unit as set forth in claim 8, in which said sensing element is an arm pivotally mounted with one end in said housing about a substantialiy horizontal axis and has at said one end a cam formation, with said arm being with its other end spring-urged toward the axis of said through-passage, and said first element is spring-urged into follower engagement with said cam formation.

References Cited

UNITED STATES PATENTS

| | | |
|---|---|---|
| 2,023,665 | 12/1935 | Clayton. |
| 2,119,570 | 6/1938 | Baillhart. |
| 2,167,991 | 8/1939 | Cadden. |
| 2,295,327 | 9/1942 | Bendz. |
| 2,747,222 | 5/1956 | Koch et al. |
| 2,804,592 | 8/1957 | Briskeborn. |
| 3,288,895 | 11/1966 | Windeler. |

WILLIAM J. STEPHENSON, *Primary Examiner.*